(12) United States Patent  (10) Patent No.: US 6,590,162 B1
Luedicke et al.  (45) Date of Patent: Jul. 8, 2003

(54) WIRE GUIDE

(75) Inventors: Martin Luedicke, Columbia, SC (US); Martin Lenk, Blythewood, SC (US)

(73) Assignee: Siemens Diesel Systems Technology, Blythewood, SC (US)

( * ) Notice: Subject to any disclaimer, the term of this patent is extended or adjusted under 35 U.S.C. 154(b) by 0 days.

(21) Appl. No.: 10/195,451

(22) Filed: Jul. 16, 2002

(51) Int. Cl.⁷ .................................................. H01B 7/00
(52) U.S. Cl. ..................... 174/135; 174/52.1; 174/72 A
(58) Field of Search .............................. 174/68.3, 70 C, 174/70 A, 71 R, 72 A, 72 C, 52.1, 135, 136

(56) References Cited

U.S. PATENT DOCUMENTS

| | | | | |
|---|---|---|---|---|
| 5,598,824 A | * | 2/1997 | Treusch et al. | 123/470 |
| 5,685,476 A | * | 11/1997 | Miyoshi | 228/180.5 |
| 5,703,330 A | * | 12/1997 | Kujawski | 174/72 A |
| 5,729,436 A | * | 3/1998 | Yoshigi et al. | 361/752 |
| 5,774,036 A | * | 6/1998 | Hrytzak et al. | 336/192 |
| 6,229,090 B1 | * | 5/2001 | Kawaguchi et al. | 174/72 A |
| 6,325,318 B1 | * | 12/2001 | Stratico et al. | 242/433.4 |
| 6,388,196 B1 | * | 5/2002 | Liu et al. | 174/135 |

* cited by examiner

Primary Examiner—Dean A. Reichard
Assistant Examiner—Adolfo Nino
(74) Attorney, Agent, or Firm—McGuireWoods LLP

(57) ABSTRACT

A wire guide includes a body having an opening adapted to conform to a shape of a control valve body of a fuel injector. A first channel is provided on a first side of the body and an extension extends from a second, opposing side of the body. A second channel is formed on the extension. At least one clip is formed on a periphery of the body between the first channel and the second channel. At least two projections may inwardly extend from a wall which defines the opening. And, rounded protuberances may extend from an underside of the body at opposing sides thereof.

33 Claims, 4 Drawing Sheets

WIRE GUIDE

BACKGROUND OF THE INVENTION

1. Field of the Invention

The present invention generally relates to a wire guide for a fuel injector and, more particularly, to a wire guide used to route solenoid wires around a control valve of a fuel injector and between rocker arm assemblies.

2. Background Description

Fuel injected engines are designed for both efficiency and longevity. These efficiencies range from the materials used to construct the engines to the fuel injectors used in the engines, themselves. In current engine designs, the fuel injectors are placed beneath valve covers of the engine in order to inject fuel into the combustion chamber.

In general, the fuel injector includes a driver which delivers a current or voltage to an open side of an open coil solenoid. The magnetic force generated in the open coil solenoid will shift a spool into the open position so as to align grooves or orifices (hereinafter referred to as "grooves") of the control valve body and the spool. The alignment of the grooves permits the working fluid (i.e., hydraulic fluid) to flow into an intensifier chamber from an inlet portion of the control valve body. The high pressure fluid then acts on an intensifier piston which compresses fuel located within a high pressure plunger chamber. As the pressure in the high pressure plunger chamber increases, the fuel pressure rises above a needle check valve opening pressure. At the prescribed fuel pressure level, the needle check valve will shift against a needle spring and open the injection holes in a nozzle lip for injection.

At the end of the cycle, the driver will deliver a current or voltage to the closed coil solenoid. The magnetic force generated in the closed coil solenoid will shift the spool into the closed position so as to align grooves of the spool with ejection or discharge ports of the control valve body. This alignment permits the working fluid to flow from the intensifier chamber, through the discharge ports and then be ejected from the control valve body, via the discharge ports. The discharge of the working fluid is at a high pressure. Once the working fluid is discharged, it is captured and reused by the injector.

To control the fuel injectors, solenoid wires are coupled between the driver and the respective open side coil solenoid and the closed side coil solenoid. These solenoid wires deliver the current or voltage from the driver to the respective open coil solenoid and the closed coil solenoid. In this manner, the generated magnetic forces are able to shift the spool between the open and closed positions. However, these solenoid wires are routed over the discharge ports and adjacent the rocker arm assemblies of the engine. The wire harness assemblies for the solenoid wires are also located adjacent the rocker arm assemblies in such a manner that the solenoid wires must bridge the gap between the open and closed coil solenoid and the wire harness assembly (which is approximately 150 mm). In such a harsh environment, the solenoid wires are subject to failure which may arise from, for example, 1. vibrations caused by the rocker arm assemblies,
2. chaffing or striking from the rocker arm assemblies, and
3. vibrations caused when the working fluid is discharged from the fuel injectors.

These factors, over time, lead to a failure of the fuel injector. This, of course, adversely affects the efficiency of the engine and, in instances, may result in a catastrophic failure of the engine. In this manner, the engine is not designed for efficiency.

The present invention is directed to overcoming one or more of the problems as set forth above.

SUMMARY OF THE INVENTION

In a first aspect of the present invention, a wire guide includes a body having an opening adapted to conform to a shape of a control valve body of a fuel injector. A first channel is provided on a first side of the body and an extension extends from a second, opposing side of the body. A second channel is formed on the extension. At least one clip is formed on a periphery of the body between the first channel and the second channel. In embodiments, the at least one clip includes opposing walls and a member extending between the opposing walls. The opposing walls and the extending member form a passageway for securing at least one solenoid wire therebetween. At least two projections may inwardly extend from a wall which defines the opening. And, rounded protuberances may extend from an underside of the body at opposing sides thereof.

In a second embodiment, the wire guide includes a body having an opening adapted to conform to a shape of a control valve body of a fuel injector, first and second channels and an extension extending from the body on a second, opposing side. The second channel is formed on the extension. A first and a second clip are formed on the periphery of the body between the first channel and the second channel. At least two projections inwardly extend from a wall which defines the opening. The projections engage a groove or grooves of the fuel injector. In embodiments, the first clip includes opposing wall members and a member extending between the opposing wall members. The opposing wall members and the extending member form a passageway for securing at least one solenoid wire therebetween. The second clip includes opposing walls and a space formed therebetween, and a projection extending from one of the opposing walls in order to maintain the at least one solenoid wire within the space. In further embodiments, downward extending protrusions extend from the body and a slot is provided in one of the downward extending protrusions. Rounded protuberances may also extend from an underside of the body at opposing sides thereof In still another embodiment, a fuel injector is provided. The fuel injector includes a control valve body, an intensifier housing and at least one groove formed on one of (i) the control valve body, (ii) the intensifier housing and (iii) between the control valve body and the intensifier housing. A nozzle assembly is coupled to the intensifier housing. A wire guide is coupled to the control valve body. The wire guide includes a body having an opening adapted to conform to a shape of the control valve body, a first and second channel and an extension. The second channel is formed on the extension. A first clip is formed on a periphery of the body between the first channel and the second channel and at least two projections inwardly extend from a wall which defines the opening and further engage the at least one groove. The first channel and the second channel route at least one solenoid wire away from discharge ports of the control valve body and rocker arm assemblies of an engine, and the clip retains the at least one solenoid wire about a periphery of the body and the control valve body.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to a wire guide used with a fuel injector. The wire guide is adapted to be coupled about a control valve of the fuel injector, and to further route the solenoid wires away from the rocker arm assemblies and fluid discharge ports of the fuel injector, itself. These features ensure that the rocker arm assemblies as well as the fluid being ejected from the fuel injector will not fray, fatigue or otherwise cause a failure of the solenoid wires. The wire guide also ensures that the solenoid wires remain substantially stationary thereby preventing any fatigue or failure of the solenoid wires caused by vibrational events.

Embodiments of the Wire Guide of the Present Invention

Figure 1:
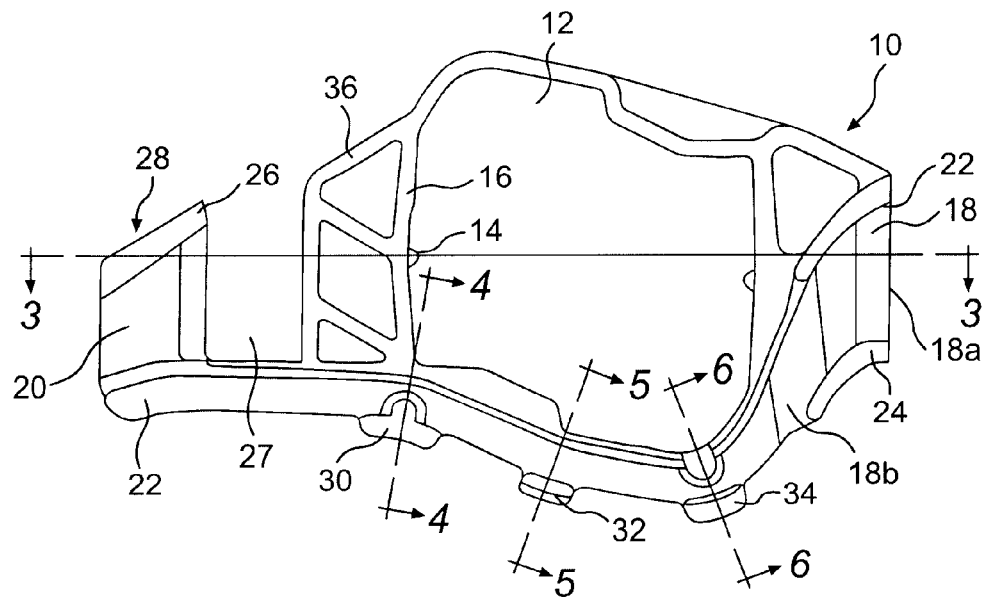
FIG. 1 shows a top view of the wire guide of the present invention.

Referring now to FIG. 1, a top view of the wire guide of the present invention is shown. The wire guide includes a body portion generally depicted as reference numeral 10. In embodiments, the body portion 10 has an opening 12 which is adapted to conform to the exterior shape of the control valve. In embodiments, the shape of the opening 12 is trapezoidal, polygonal or non-circular or other shape which prevents rotation of the wire guide about the control valve. This insures that the wire guide, itself, and the solenoid wires, which are coupled to the wire guide, remain stationary.

At least two projections 14 preferably extend inwardly from walls 16 which define the opening 12. These projections 14 are adapted to engage a groove or grooves of the fuel injector, and more preferably grooves formed between the control valve body and an intensifier housing of the fuel injector. The groove or grooves may also be formed on the control valve body or the intensifier housing. The grooves define stopping points for the wire guide during the assembly thereof. Additionally, the grooves in combination with the projections 14 retain the wire guide on the fuel injection thus ensuring that the wire guide remains stationary on the fuel injector. In embodiments, more than two projections 14 such as, for example, three or more projections 14, may also be provided on the wire guide.

FIG. 1 further shows opposing channels 18 and 20 provided on opposing sides of the body 10 of the wire guide. The channel 18, in embodiments, corresponds to the closed coil solenoid side of the control valve: Similarly, the channel 20, in embodiments, corresponds to the open coil solenoid side of the control valve. The channel 18 is defined by opposing, upstanding walls 22, 24. In embodiments, the upstanding wall 22 extends from the channel 18 to the channel 20, and defines an interior retaining wall about at least one side of the body 10. This interior retaining wall may act as a guide for routing the solenoid wires about a periphery of the control valve body. The upstanding wall 22 may be separated into discrete sections or, in embodiments, may be one, continuous wall. The exterior wall 24 preferably has a significant radius in order to (i) allow the use of a torque tool for securing the fuel injector, via an injector hold down clamp, to the engine and (ii) provide a smooth transition between the channel 18 and the remaining exterior portion of the upstanding wall 22. The two walls 22 and 24 form a larger entryway 18a at the distal side of the channel 18 and a smaller outlet passage 18b at a proximal side of the channel 18. This allows the solenoid wire to be easily routed about the wire guide from the closed coil solenoid side to the open coil solenoid side.

The channel 20 is formed by the upstanding wall 22 and an upstanding wall 26, and is provided on an extension generally depicted as reference numeral 28. A space 27 is formed between the extension 28 and the body 10 of the wire guide. The upstanding wall 22, in embodiments, may isolate the set of solenoid wires extending from the open and closed coil solenoids. The walls 22 and 26, in conjunction with the extension 28, define a passageway which is capable of routing the solenoid wires away from or between adjacent rocker arm assemblies. More preferably, the extension 28 is designed to route the solenoid wires between two rocker arm assemblies thus preventing the rocker arm assemblies from chaffing or striking the solenoid wires. The extension 28 should also, in embodiments, extend away from the body 10 in order to avoid any undue bending of the solenoid wires which extend from the open coil solenoid side of the control valve body of the fuel injector. It should further be understood that one design restraint on the size and shape of the extension 28 (as well as the entire exterior shape of the body) is the allowable insulation area provided for each individually designed engine.

FIG. 1 further shows a plurality of clips 30, 32 and 34 which are positioned about an outer periphery portion of the body 10. More preferably the clips 30, 32 and 34, formed partly by the upstanding wall 22, retains the solenoid wires therein (and about the periphery of the control valve). The clips 30, 32 and 34 prevent any substantial movement of the solenoid wires, and additionally ensure that the solenoid wires do not extend over the discharge ports of the control valve. This latter feature prevents the working fluid from spilling out onto the solenoid wires at a high pressure which, in turn, prevents any breakage of the solenoid wires due to vibrational forces generated by the working fluid. In one embodiment, the clip 30 is positioned on an interior portion of a radius and the clips 32 and 34 are positioned on an exterior portion of a radius. It should be well understood by those of ordinary skill in the art, though, that the clips 30, 32 and 34 may consist of more or less than three clips and may be positioned at other locations, depending on the shape and configuration of the control body. A honeycomb structure 36 may further be provided for additional structural support.

Figure 2:
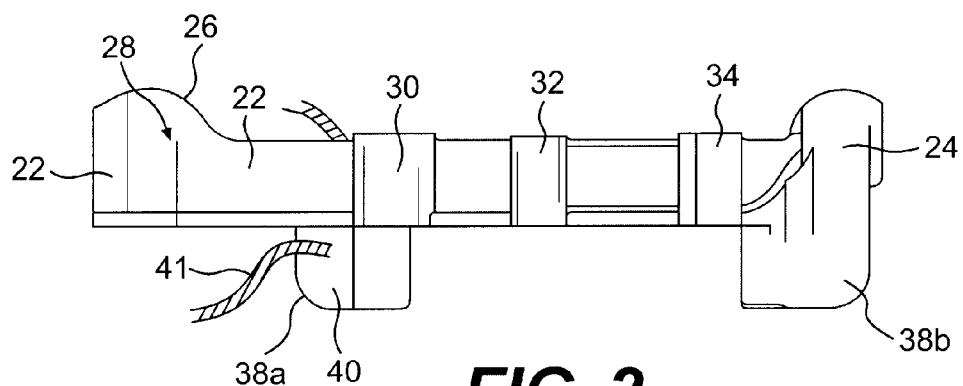
FIG. 2 shows a side view of the wire guide of the present invention.

FIG. 2 shows a side view of the wire guide of the present invention. This view shows the upstanding wall 22 as a continues wall which extends about an exterior periphery of the opening 12. In embodiments, the clip 30 is spaced from the extension 28. Additionally, the body 10 includes extending protrusions 38a and 38b. A slot 40 is optionally provided in the protrusion 38a, and is used for an optional wire wrap 41 which can extend through and around the honeycomb structure 36. The wrap 41, in addition to the clips, may be used to hold the solenoid wires to the wire guide.

Figure 3:
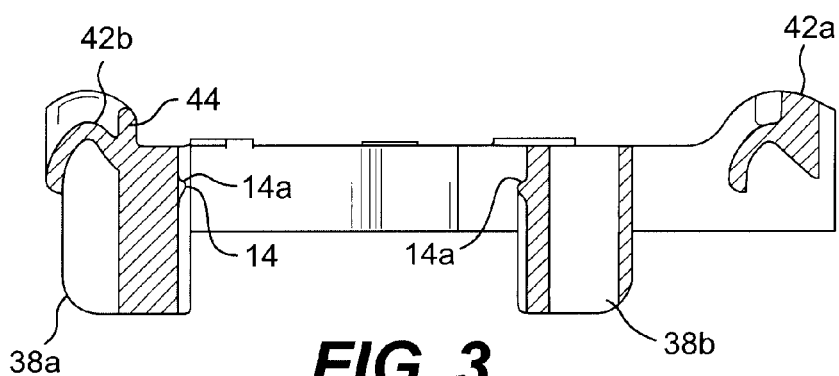
FIG. 3 shows a cross sectional view of the wire guide of the present invention along lines 3—3 of FIG. 1.

FIG. 3 is a sectional view of the wire guide along line 3—3 of FIG. 1. In this view, rounded protuberances 42a and 42b are shown to extend from the body 10 at opposing sides thereof. The rounded protuberances 42a and 42b include a radii which ensures that the solenoid wires extending from the open and closed coil solenoid maintain a minimum bend radius, preferably two or three times the diameter of the wire. This maintains the integrity of the solenoid wires even when being routed from the solenoid coils and towards the channels 18 and 20. A tongue 44 which is formed as part of the wall 22 and proximate to the rounded protuberance 42b assists in maintaining the integrity of the solenoid wires by guiding the solenoid wires to the rounded protuberance 42b. As further shown, the projections 14 may include a flat underside surface 14a in order to better engage the grooves of the fuel injector thereby ensuring that the wire guide remains coupled to the fuel injector.

Figure 4:
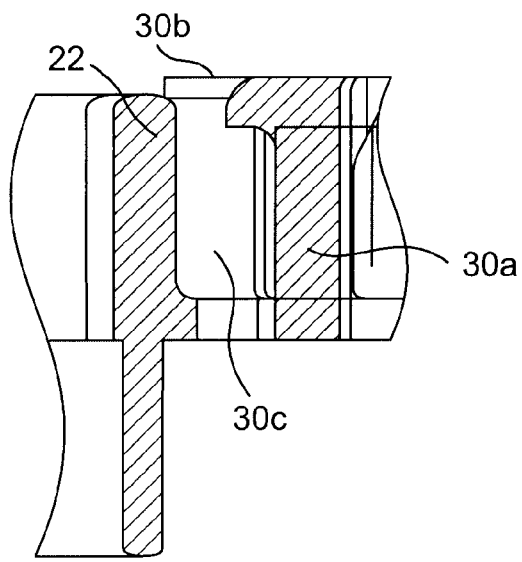
FIG. 4 shows a cross sectional view of a first clip of the wire guide of the present invention along lines 4—4 of FIG. 1.

FIG. 4 is a cross sectional view of the clip 30. In the embodiment of FIG. 4, the clip 30 includes a portion of the wall 22 and an opposing wall or arm 30a. A member 30b extends between the walls 22 and 30a. The member 30b is preferably a flexible or elastic piece of material which, in combination with the walls 22 and 30a, forms a passageway 30c. The member 30b retains the solenoid wire within the passageway 30c.

Figure 5:
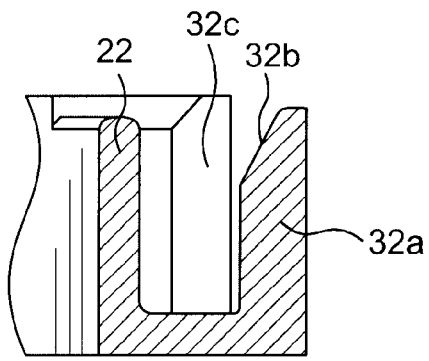
FIG. 5 shows a cross sectional view of a second clip of the wire guide of the present invention along lines 5—5 of FIG. 1.

FIG. 5 is a cross sectional view of the clip 32. The clip 32 is also formed partly from a portion of the wall 22 and an opposing wall or arm 32a. The wall 32a includes a bevel 32b which assists in the placement of the solenoid wire within a space 32c formed between the walls 22 and 32a. In embodiments, a member may also extend between the walls 22 and 32a, but this is most preferable when the clip 32 is placed on an inner radius of the body 10.

Figure 6:
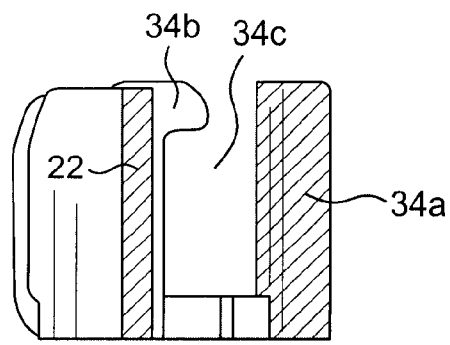
FIG. 6 shows a cross sectional view of a third clip of the wire guide of the present invention along lines 6—6 of FIG. 1.

FIG. 6 is a cross sectional view of the clip 34. The clip 34 is also formed partly from a portion of the wall 22 and an opposing wall or arm 34a. The wall 34a includes a projection 34b which assists in maintaining the solenoid wire within the space 34c formed between the walls 22 and 34a. In embodiments, the projection 34b may extend the entire span between the walls 22 and 34a, but this is most preferable when the clip 34 is placed on an inner radius of the body 10. It should be readily recognized from the above description that the spaces 30c, 32c and 34c are sized to maintain the solenoid wires within the respective clips while preventing any vibrations or possible dislodgment of the solenoid wires therefrom. The clips also ensure that the solenoid wires are routed around the control valve body, itself.

Method of Using the Wire Guide of the Present Invention

Figure 7:
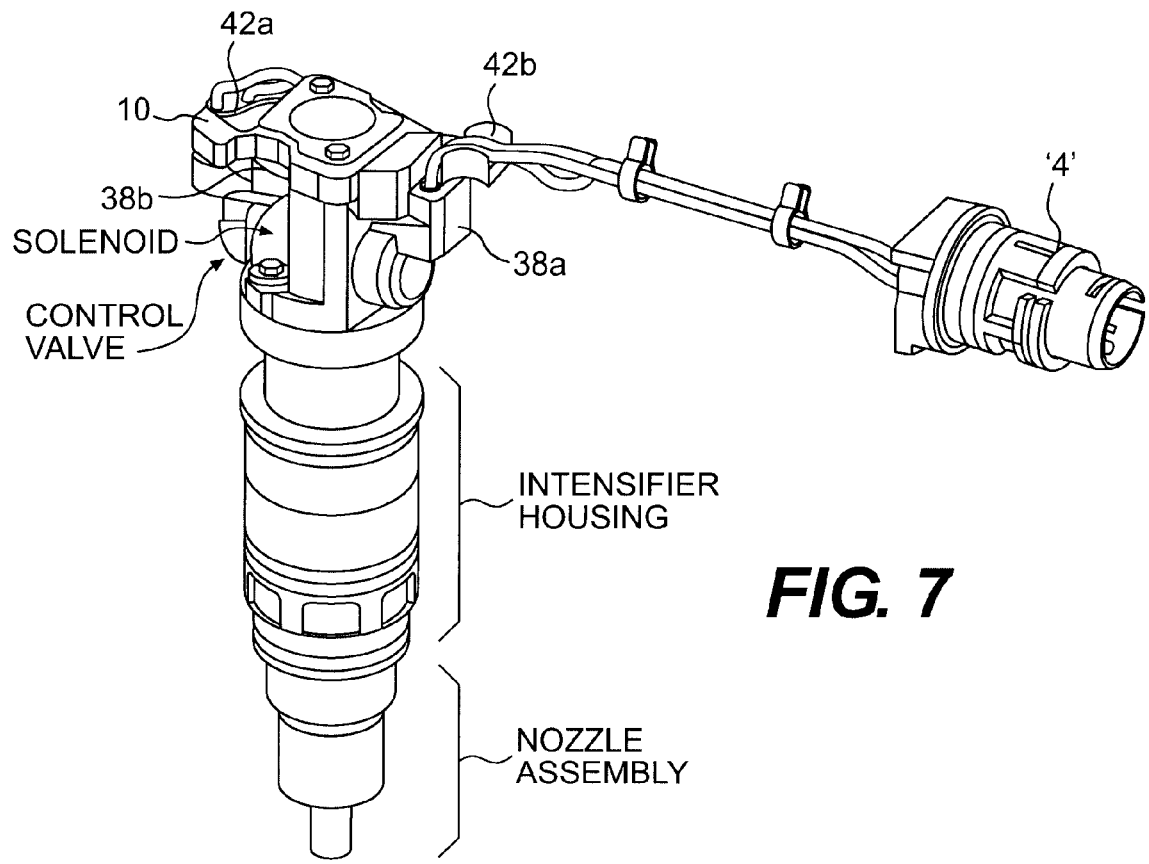
FIG. 7 shows a perspective view of the wire guide coupled to a fuel injector.
Figure 8:
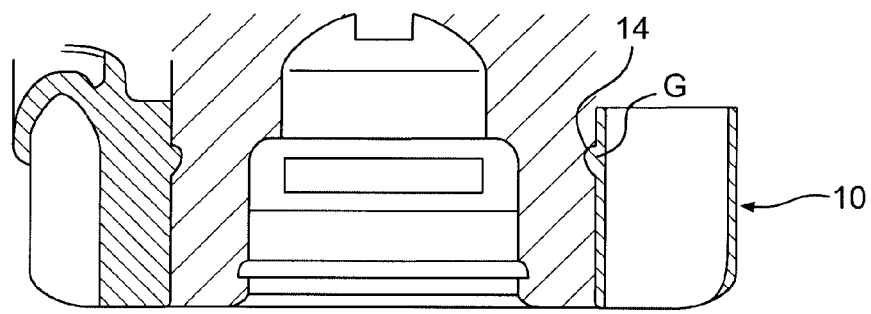
FIG. 8 shows projections of the wire guide engaging grooves of the fuel injector.

In use and referring to FIG. 7, the wire guide is placed over the fuel injector such that the features shown in FIG. 1 are facing the intensifier housing and nozzle assembly of the fuel injector. In this orientation, the opening 12 of the wire guide is placed over a control valve body of the fuel injector. As shown, the opening 12 conforms to the exterior shape of the control valve body which ensures that the wire guide and solenoid wires remain stationary on the fuel injector. FIG. 8 shows the projections 14 engaging, preferably, with one or more grooves "G" of the fuel injector. As further shown in FIG. 7, the protrusions 38a and 38b, respectively, contact the open and closed solenoid coils of the fuel injector. The solenoid wires are then routed about the rounded protuberances 42a and 42b at opposing sides thereof. The rounded protuberances 42a and 42b include a radii which maintains a minimum bend radius of the solenoid wires even when being routed from the control valve body and towards the channels 18 and 20. The closed coil wires, in embodiments, also extend about the tongue 44. Both the solenoid wires extending from the closed and open solenoid coils extend to wiring harness "H".

Figure 9:
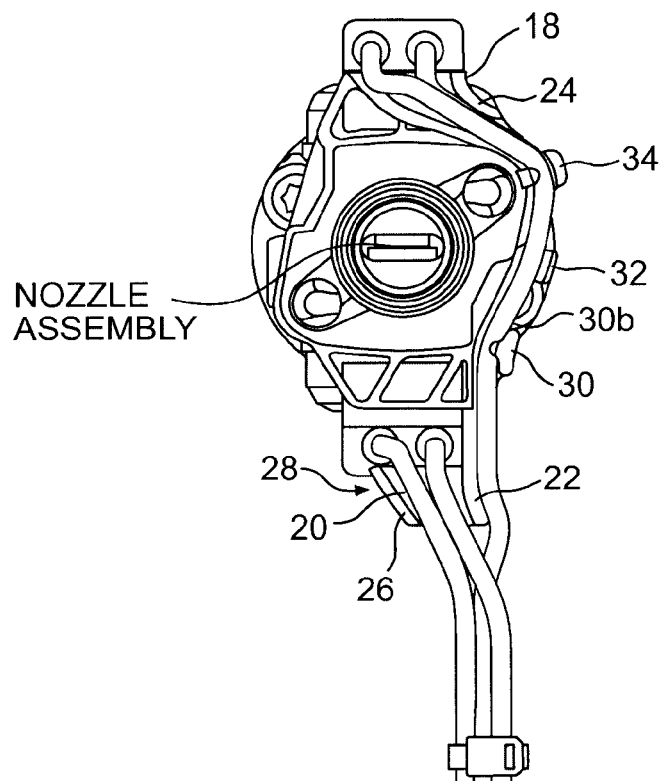
FIG. 9 shows a bottom view of the wire guide coupled to the fuel injector.

As shown in FIG. 9, the solenoid wires, on the closed coil side, are looped about the channel 18, between the upstanding wall 22 and exterior wall 24. The solenoid wires are then routed about the outer periphery portion of the body 10 and held in place via the clips 30, 32 and 34 to prevent any substantial movement of the solenoid wires, and additionally ensure that the solenoid wires do not extend over the discharge ports of the control valve. In the embodiment shown in FIG. 9, the clip 30 includes a flexible member 30b which extends only partly between the opposing walls 22 and 30a. The solenoid wires extending from the open coil side are routed via the channel 20, and extend to the solenoid wires of the closed coil side. The extension 28 ensures that the solenoid wires are routed away from the rocker arm assemblies. Also, the space 27 between the body 10 and the extension 28 permits the solenoid wires to extend therethrough. The solenoid wires are shown to be connected to a harness "H".

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A wire guide comprising:
   a body having an opening adapted to conform to a shape of a control valve body of a fuel injector;
   a first channel on a first side of the body;
   an extension extending from a second, opposing side of the body;
   a second channel formed on the extension; and
   at least one clip formed on a periphery of the body between the first channel and the second channel.

2. The wire guide of claim 1, wherein the at least one clip includes at least two clips.

3. The wire guide of claim 1, wherein the at least one clip includes opposing walls and a member extending between the opposing walls, the opposing walls and the extending member forming a passageway for securing at least one solenoid wire therein.

4. The wire guide of claim 3, wherein the extending member is flexible.

5. The wire guide of claim 3, wherein another clip of the at least one clip includes opposing walls and a space formed therebetween, one of the opposing walls includes a bevel.

6. The wire guide of claim 3, wherein another clip of the at least one clip includes opposing walls and a space formed therebetween, and a projection extending from one of the opposing walls in order to maintain at least one solenoid wire within the space.

7. The wire guide of claim 1, wherein the opening formed in the body is a non-circular shape which prevents rotation of the wire guide about the control valve body.

8. The wire guide of claim 1, further comprising at least two projections inwardly extending from a wall which defines the opening.

9. The wire guide of claim 1, wherein:
the first channel corresponds to a closed coil solenoid side of the control valve body; and
the second channel corresponds to an open coil solenoid side of the control valve body.

10. The wire guide of claim 1, wherein the first and second channel are defined by opposing, upstanding walls.

11. The wire guide of claim 10, wherein one of the opposing, upstanding walls extends from the first channel to the second channel.

12. The wire guide of claim 11, wherein the one of the opposing, upstanding walls is provided in non-contiguous sections.

13. The wire guide of claim 11, wherein the one of the opposing, upstanding walls forms a portion of the at least one clip.

14. The wire guide of claim 1, further comprising downward extending protrusions extending from the body.

15. The wire guide of claim 14, further comprising a slot provided in one of the downward extending protrusions.

16. The wire guide of claim 15, further comprising a honeycomb structure formed on the body, proximate the slot.

17. The wire guide of claim 16, further comprising a wire wrap extending through the slot and the honeycomb structure.

18. The wire guide of claim 1, further comprising rounded protuberances extending from an underside of the body at opposing sides thereof corresponding substantially to positions of the first and second channels.

19. The wire guide of claim 18, wherein the rounded protuberances include a radii which maintains a minimum bend radius of solenoid wires extending from the control valve body.

20. The wire guide of claim 19, wherein the minimum bend radius is one of two or three times the diameter of the solenoid wires.

21. The wire guide of claim 19, further comprising a tongue for routing the solenoid wires to one of the rounded protuberances.

22. A wire guide, comprising:
a body having an opening adapted to conform to a shape of a control valve body of a fuel injector;
a first channel on a first side of the body;
an extension extending from the body on a second, opposing side;
a second channel formed on the extension;
a first clip formed on a periphery of the body between the first channel and the second channel;
a second clip formed on the periphery of the body between the first channel and the second channel; and
at least two projections inwardly extending from a wall which defines the opening, wherein
the first channel routes at least one solenoid wire towards the second channel,
the first and second clip retains the at least one solenoid wire about the periphery of the body and control valve body, and
the second channel routes another at least one solenoid wire and the at least one solenoid wire away from rocker arm assemblies of an engine.

23. The wire guide of claim 22, wherein:
the first clip includes opposing wall members, a portion of the body and a extending member between the opposing wall members, the opposing wall members, the portion of the body and the extending member forming a passageway for securing the at least one solenoid wire therebetween; and
the second clip includes opposing walls, another portion of the body and a space formed therebetween, and a projection extending from one of the opposing walls in order to maintain the at least one solenoid wire within the space.

24. The wire guide of claim 23, wherein the extending member is flexible.

25. The wire guide of claim 22, wherein the opening formed in the body is one of a trapezoidal or polygonal shape which prevents rotation of the wire guide about the control valve.

26. The wire guide of claim 22, wherein:
the first channel corresponds to a closed coil solenoid side of the control valve body; and
the second channel corresponds to an open coil solenoid side of the control valve body.

27. The wire guide of claim 26, wherein:
the first and second channel are defined by opposing, upstanding walls;
one of the opposing, upstanding walls extends from the first channel to the second channel and provides a guide for the at least one solenoid wire to extend about a periphery of the control valve body;
the one of the opposing, upstanding walls forms part of the first and second clip.

28. The wire guide of claim 22, further comprising downward extending protrusions extending from an underside of the body.

29. The wire guide of claim 28, further comprising a slot provided in one of the downward extending protrusions.

30. The wire guide of claim 22, further comprising rounded protuberances extending from an underside of the body at opposing sides thereof which correspond substantially to positions of the first channel and the second channel.

31. The wire guide of claim 30, wherein the rounded protuberances include a radii which maintains a minimum bend radius of the at least one and the another solenoid wires extending from the control valve body.

32. The wire guide of claim 30, further comprising a tongue for routing the solenoid wires to one of the rounded protuberances.

33. A fuel injector, comprising:
a control valve body;
an intensifier housing coupled to the control valve body;
a groove formed on one of (i) the control valve body, (ii) the intensifier housing and (iii) between the control valve body and the intensifier housing;
a nozzle assembly coupled to the intensifier housing; and
a wire guide coupled proximate the control valve body, the wire guide comprising:
a body having an opening adapted to conform to a shape of the control valve body;
a first channel on a first side of the body;
a second channel on an extension extending outwardly from a second, opposing side of the body; and
a clip formed on a periphery of the body between the first channel and the second channel,
wherein the first channel and the second channel routes at least one solenoid wire away from discharge ports of the control valve body and rocker arm assemblies of an engine, and
wherein the clip retains the at least one solenoid wire about a periphery of the control valve body.

* * * * *